(12) United States Patent
Mitsuyu et al.

(10) Patent No.: US 7,190,816 B2
(45) Date of Patent: Mar. 13, 2007

(54) FINGERPRINT AUTHENTICATING SYSTEM FOR CARRYING OUT A FINGERPRINT AUTHENTICATION BY USING A SMALL FINGERPRINT SENSOR

(75) Inventors: Norihisa Mitsuyu, Tokyo (JP);
Teruyuki Higuchi, Tokyo (JP)

(73) Assignee: NEC Corporation, Tokyo (JP)

( * ) Notice: Subject to any disclaimer, the term of this patent is extended or adjusted under 35 U.S.C. 154(b) by 705 days.

(21) Appl. No.: 10/408,547

(22) Filed: Apr. 8, 2003

(65) Prior Publication Data
US 2003/0194114 A1 Oct. 16, 2003

(30) Foreign Application Priority Data
Apr. 10, 2002 (JP) .............................. 2002-107406

(51) Int. Cl.
*G06K 9/00* (2006.01)
(52) U.S. Cl. ...................................... 382/124; 382/218
(58) Field of Classification Search ............... 340/5.83; 382/124, 126, 173, 125, 218
See application file for complete search history.

(56) References Cited

U.S. PATENT DOCUMENTS

| 5,864,296 | A | 1/1999 | Upton | |
|---|---|---|---|---|
| 6,289,114 | B1 | 9/2001 | Mainguet | |
| 6,731,779 | B2 * | 5/2004 | Satoh | 382/124 |
| 6,898,301 | B2 * | 5/2005 | Iwanaga | 382/124 |
| 6,929,180 | B2 * | 8/2005 | Tsukamoto et al. | 235/382 |
| 6,970,584 | B2 * | 11/2005 | O'Gorman et al. | 382/126 |
| 6,980,673 | B2 * | 12/2005 | Funahashi | 382/124 |
| 7,031,501 | B2 * | 4/2006 | Adachi et al. | 382/124 |
| 2003/0194114 | A1 * | 10/2003 | Mitsuyu et al. | 382/124 |

FOREIGN PATENT DOCUMENTS

| CN | 1137136 A | 12/1996 |
|---|---|---|
| CN | 1172308 A | 2/1998 |
| EP | 0813164 A1 | 12/1997 |
| EP | 1239404 A2 | 9/2002 |
| EP | 1353291 A2 * | 10/2003 |
| JP | 10-91769 A | 4/1998 |
| JP | 2001-155137 A | 6/2001 |
| WO | WO 9850877 A1 | 11/1998 |
| WO | WO 9963476 A1 | 12/1999 |
| WO | WO 01/57781 A1 | 8/2001 |

* cited by examiner

*Primary Examiner*—Gregory Desire
(74) *Attorney, Agent, or Firm*—Sughrue Mion, PLLC

(57) ABSTRACT

A fingerprint authenticating system includes a fingerprint registering unit and a fingerprint collating unit. The fingerprint registering unit takes a first fingerprint data indicating a first portion of a first fingerprint from a first fingerprint sensor, registers said first fingerprint data to a memory unit, and takes a second fingerprint data indicating a second portion of a second fingerprint from a second fingerprint sensor. The fingerprint collating unit collates said second fingerprint data with said first fingerprint data to confirm whether or not said first fingerprint is equal to said second fingerprint. Here, an area of the first portion is equal to or larger than an area of the second portion.

37 Claims, 11 Drawing Sheets

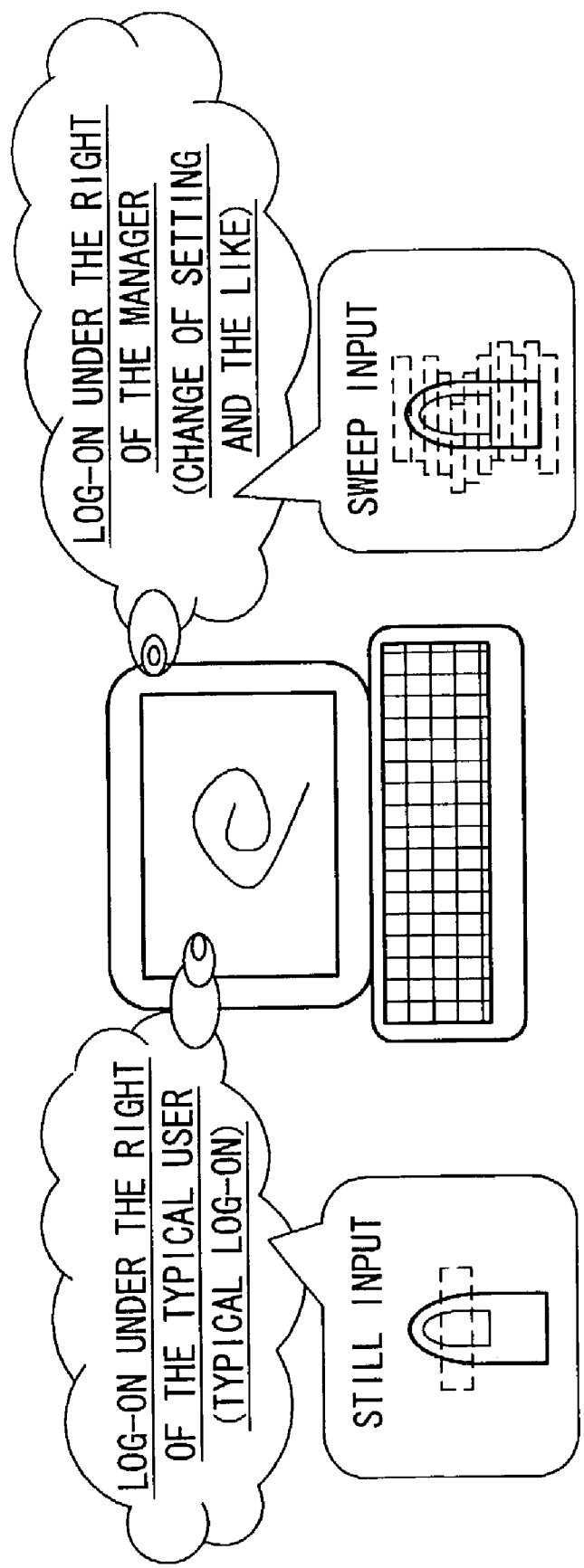

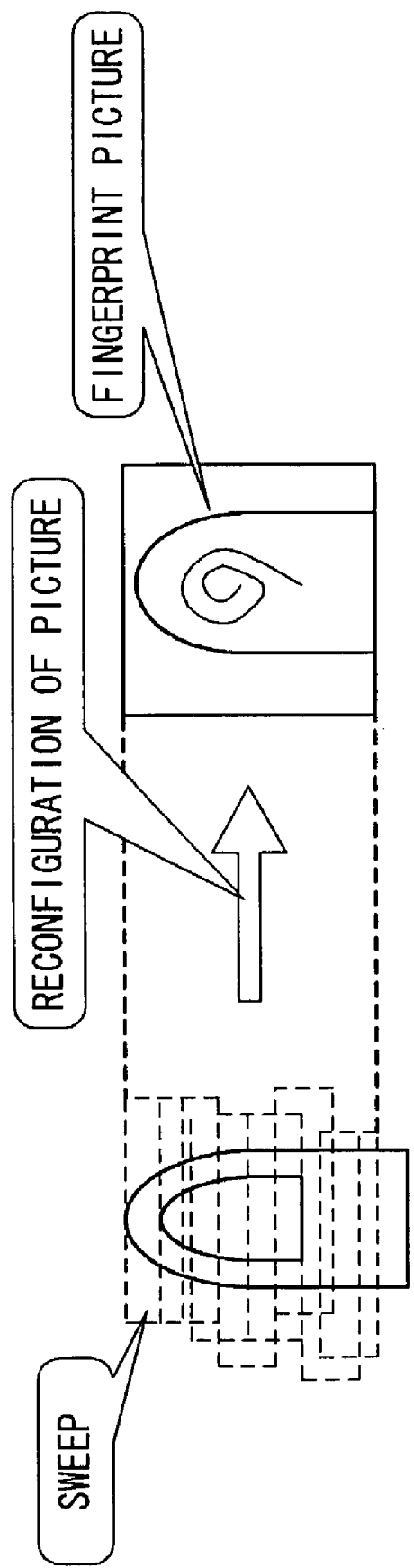

FINGERPRINT AUTHENTICATING SYSTEM FOR CARRYING OUT A FINGERPRINT AUTHENTICATION BY USING A SMALL FINGERPRINT SENSOR

BACKGROUND OF THE INVENTION

1. Field of the Invention

The present invention relates to a fingerprint authenticating system, a fingerprint authenticating method and a fingerprint authenticating program. More particularly, the present invention relates to a technique for using a small fingerprint sensor and carrying out a fingerprint authentication.

2. Description of the Related Art

In recent years, personal information has been registered in an information processor, such as PHS (Personal Handyphone System), PDA (Personal Data Assistant) and a personal computer, in many cases. On the other hand, there is a problem that the personal information registered in such an information processor is illegally used by a different person. For example, in association with the miniaturization of the information processor, an opportunity that it is carried is increased to thereby bring about misplacement and loss and the like. The occurrence of such situations brings about the leakage of the personal information registered in the information processor. Thus, it is desired to develop an authenticating system having excellent convenience that can be installed in a small apparatus.

As one of such authenticating systems, a fingerprint authenticating system for using a fingerprint and carrying out an authentication is known. As one of fingerprint sensors used in this fingerprint authenticating system, a flat fingerprint sensor is known. This flat fingerprint sensor includes a reading unit having a scale corresponding to a size of a finger so that the substantially entire portion of a fingerprint can be read at one scanning operation. Thus, the flat fingerprint sensor has a problem that since its outer shape is large, the yield of a manufacture is poor and becomes thereby expensive. Hence, it is difficult to install in a small apparatus and a cheap apparatus such as a portable telephone.

As a method of solving such a problem, Japanese Laid Open Patent Application (JP-A-Heisei 10-91769) discloses a fingerprint reading system that uses a sweep type of a fingerprint sensor. In this fingerprint reading system, a user slides his or her finger while it is in contact with the fingerprint sensor when it is read. The fingerprint sensor divides the fingerprint of this slid finger into rectangular strips and reads them. A fingerprint picture obtained by this reading operation is re-configurationally processed by software. Consequently, a fingerprint picture for the entire finger is generated and used for the authentication According to this sweep type of the fingerprint sensor, the length of the sensor in the slid direction can be shortened to thereby design the fingerprint sensor at a small scale and a cheap price.

Japanese Laid Open Patent Application (JP-A 2001-155137) discloses a potable electric apparatus of a fingerprint reading system. This apparatus uses the sensor whose shape of the reading portion is like a T character.

However, the fingerprint reading system that uses the conventional sweep type fingerprint sensor as mentioned above has the following problems. Thus, the fingerprint sensor is not installed in the small apparatus and the cheap apparatus, for example, such as a portable telephone and the like. That is, this fingerprint reading system requires the operation for contacting the finger with the fingerprint sensor and sliding it. This system is not preferred since the operation compels the user to carry out a new work. Also, this system has a problem that the contaminant such as sebum and dirt of the finger is deposited around the fingerprint sensor. Moreover, this fingerprint reading system needs the re-configuration of the picture read by the fingerprint sensor. Hence, this system requires a long time for the authentication. In order to avoid this problem, a processor having a high performance needs to be installed in an apparatus.

SUMMARY OF THE INVENTION

Therefore, an object of the present invention is to provide a fingerprint authenticating system, a fingerprint authenticating method and a fingerprint authenticating program, which can reduce an operation to be carried out by a user in order to read a fingerprint.

Another object of the present invention is to provide a fingerprint authenticating system, a fingerprint authenticating method and a fingerprint authenticating program, which can reduce an amount of contaminants deposited around a fingerprint sensor.

Still another object of the present invention is to provide a fingerprint authenticating system, a fingerprint authenticating method and a fingerprint authenticating program, which can be further applied to a small cheap apparatus.

In order to achieve an aspect of the present invention, the present invention provides a fingerprint authenticating system including: a fingerprint registering unit and a fingerprint collating unit. The fingerprint registering unit takes a first fingerprint data indicating a first portion of a first fingerprint from a first fingerprint sensor, registers the first fingerprint data to a memory unit, and takes a second fingerprint data indicating a second portion of a second fingerprint from a second fingerprint sensor. The fingerprint collating unit collates the second fingerprint data with the first fingerprint data to confirm whether or not the first fingerprint is equal to the second fingerprint. Here, an area of the first portion is equal to or larger than an area of the second portion.

In the present invention, the first fingerprint sensor is relatively moved against the first fingerprint while taking the first fingerprint data. The second fingerprint sensor is relatively stopped against the second fingerprint while taking the second fingerprint data. 3. In the present invention, the first fingerprint sensor takes the first fingerprint data of n data which is obtained by scanning the first fingerprint n times, each of the n data is different from each other, n is a positive integer. The second fingerprint sensor takes the second fingerprint data of m data which is obtained by scanning the second fingerprint m times, each of the m data is different from each other, m is a positive integer and less than n.

The fingerprint authenticating system further includes a fingerprint sensor. The fingerprint sensor is the first fingerprint sensor and the second fingerprint sensor.

In the present invention, both the first fingerprint data and the second fingerprint data are any one of image data, numeral data and character data.

In the present invention, the fingerprint sensor takes the first fingerprint data by scanning the first fingerprint toward a first direction, and takes the second fingerprint data by scanning the second fingerprint toward a second direction. Here, the first direction is different from the second direction.

In the present invention, the fingerprint registering unit reconfigures the first fingerprint data from a plurality of part data which indicate parts of the first fingerprint. The fingerprint collating unit collates the second fingerprint data with the first fingerprint data by detecting an area corresponding to the second fingerprint data from the first fingerprint data.

In the present invention, the fingerprint sensor is relatively moved against the second fingerprint while taking the second fingerprint data.

In the present invention, the fingerprint collating unit instructs an apparatus, to which the fingerprint authenticating system is applied, to carry out an operation different between one case of the second fingerprint data of the second fingerprint relatively moved against the fingerprint sensor and the other cases.

In the present invention, the fingerprint collating unit takes the second fingerprint data as data that the second fingerprint relatively stopped against the second fingerprint sensor, in one case that all of a plurality of the second fingerprint data are similar to each other, and takes the second fingerprint data of the second fingerprint relatively moved against the fingerprint sensor, in the other cases.

In the present invention, the fingerprint collating unit carries out the collation more severely in one case of the second fingerprint data of the second fingerprint relatively moved against the fingerprint sensor than in the other cases.

In the present invention, the fingerprint collating unit changes a speed of taking the second fingerprint data, based on whether or not the second fingerprint data of the second fingerprint relatively moved against the fingerprint sensor.

In the present invention, the fingerprint sensor is provided with a sweep type of a fingerprint sensor.

In order to achieve another aspect of the present invention, the present invention provides a fingerprint authenticating method including the steps of: (a) taking a first fingerprint data indicating a first portion of a first fingerprint from a first fingerprint sensor; (b) registering the first fingerprint data to a memory unit; (c) taking a second fingerprint data indicating a second portion of a second fingerprint from a second fingerprint sensor; and (d) collating the second fingerprint data with the first fingerprint data to confirm whether or not the first fingerprint is equal to the second fingerprint. Here, an area of the first portion is equal to or larger than an area of the second portion.

In the present invention, the first fingerprint sensor is relatively moved against the first fingerprint during the step (a). The second fingerprint sensor is relatively stopped against the second fingerprint during the step (c).

In the present invention, the first fingerprint sensor takes the first fingerprint data of n data which is obtained by scanning the first fingerprint n times during the step (a), each of the n data is different from each other, n is a positive integer. The second fingerprint sensor takes the second fingerprint data of m data which is obtained by scanning the second fingerprint m times during the step (c), each of the m data is different from each other, m is a positive integer and less than n.

In the present invention, the first fingerprint sensor is equal to the second fingerprint sensor.

In the present invention, both the first fingerprint data and the second fingerprint data are any one of image data, numeral data and character data.

In the present invention, the first fingerprint sensor takes the first fingerprint data by scanning the first fingerprint toward a first direction, and the second fingerprint sensor takes the second fingerprint data by scanning the second fingerprint toward a second direction. The first direction is different from the second direction.

In the present invention, the step (a) includes the step of: (a1) reconfiguring the first fingerprint data from a plurality of part data which indicate parts of the first fingerprint. The step (d) collates the second fingerprint data with the first fingerprint data by detecting an area corresponding to the second fingerprint data from the first fingerprint data.

In the present invention, the step (c) takes the second fingerprint data while the second fingerprint sensor is relatively moved against the second fingerprint.

In the present invention, the step (d) includes the step of: (d1) instructing an apparatus, to which the fingerprint authenticating method is applied, to carry out an operation different between one case of the second fingerprint data of the second fingerprint relatively moved against the fingerprint sensor and the other cases.

In the present invention, the step (c) takes the second fingerprint data as data that the second fingerprint relatively stopped against the second fingerprint sensor, in one case that all of a plurality of the second fingerprint data are similar to each other, and takes the second fingerprint data of the second fingerprint relatively moved against the fingerprint sensor, in the other cases.

In the present invention, the step (d) carries out the collation more severely in one case of the second fingerprint data of the second fingerprint relatively moved against the fingerprint sensor in the step (c) than in the other cases.

In the present invention, the step (c) changes a speed of taking the second fingerprint data, based on whether or not the second fingerprint data of the second fingerprint relatively moved against the fingerprint sensor.

In order to achieve still another aspect of the present invention, the present invention provides a computer program product embodied on a computer-readable medium and including code that, when executed, causes a computer to perform the following: (e) taking a first fingerprint data indicating a first portion of a first fingerprint from a first fingerprint sensor; (f) registering the first fingerprint data to a memory unit; (g) taking a second fingerprint data indicating a second portion of a second fingerprint from a second fingerprint sensor; and (h) collating the second fingerprint data with the first fingerprint data to confirm whether or not the first fingerprint is equal to the second fingerprint. Here, an area of the first portion is equal to or larger than an area of the second portion.

In the present invention, the first fingerprint sensor is relatively moved against the first fingerprint during the step (e). The second fingerprint sensor is relatively stopped against the second fingerprint during the step (g).

In the present invention, the first fingerprint sensor takes the first fingerprint data of n data which is obtained by scanning the first fingerprint n times during the step (e), each of the n data is different from each other, n is a positive integer. The second fingerprint sensor takes the second fingerprint data of m data which is obtained by scanning the second fingerprint m times during the step (g), each of the m data is different from each other, m is a positive integer and less than n.

In the present invention, the first fingerprint sensor is equal to the second fingerprint sensor.

In the present invention, the both first fingerprint data and the second fingerprint data are any one of image data, numeral data and character data.

In the present invention, the first fingerprint sensor takes the first fingerprint data by scanning the first fingerprint toward a first direction, and the second fingerprint sensor takes the second fingerprint data by scanning the second fingerprint toward a second direction. The first direction is different from the second direction.

In the present invention, the step (e) includes the step of: (e1) reconfiguring the first fingerprint data from a plurality of part data which indicate parts of the first fingerprint. The step (h) collates the second fingerprint data with the first fingerprint data by detecting an area corresponding to the second fingerprint data from the first fingerprint data.

In the present invention, the step (g) takes the second fingerprint data while the second fingerprint sensor is relatively moved against the second fingerprint.

In the present invention, the step (h) includes the step of: (h1) instructing an apparatus, to which the fingerprint authenticating method is applied, to carry out an operation different between one case of the second fingerprint data of the second fingerprint relatively moved against the fingerprint sensor and the other cases.

In the present invention, the step (g) takes the second fingerprint data as data that the second fingerprint relatively stopped against the second fingerprint sensor, in one case that all of a plurality of the second fingerprint data are similar to each other, and takes the second fingerprint data of the second fingerprint relatively moved against the fingerprint sensor, in the other cases.

In the present invention, the step (h) carries out the collation more severely in one case of the second fingerprint data of the second fingerprint relatively moved against the fingerprint sensor in the step (g) than in the other cases.

In the present invention, the step (g) changes a speed of taking the second fingerprint data, based on whether or not the second fingerprint data of the second fingerprint relatively moved against the fingerprint sensor.

BRIEF DESCRIPTION OF THE DRAWINGS

FIG. 9 is a view showing the fingerprint authenticating system according to the embodiment of the present invention applying to a personal computer;

FIG. 10 is a view showing the re-configuration method for a fingerprint data of the authenticating system according to the embodiment of the present invention.

DESCRIPTION OF THE PREFERRED EMBODIMENTS

Embodiments of the present invention will be described below with reference to the attached drawings. A fingerprint authenticating system according to an embodiment of the present invention is invented by paying attention to the following point. That is, the registration of a fingerprint is carried out in only the first trial when a usage of an apparatus including this fingerprint authenticating system is started, and the collation of the fingerprint is carried out for each usage of the apparatus That is, the registration of the fingerprint is carried out only one time. Thus, even if the sweep reading operation for reading the fingerprint while sliding a finger with respect to a fingerprint sensor is carried out, this operation does not impose a burden on a user. Also, the deposition of contaminant caused by the operation for sliding the finger is little. On the other hand, the fingerprint of the entire finger is obtained by the sweep reading operation. Hence, it is possible to obtain the fingerprint picture (image) having much information.

On the other hand, the collation of the fingerprint carried out for each usage of the apparatus does not impose the burden on the user, since a still reading operation is carried out for making the finger static with respect to the fingerprint sensor and then reading the fingerprint. Also, there is no deposition of the contaminant caused by the operation for sliding the finger. Moreover, the fingerprint picture having the much information is registered. Hence, at the time of the collation, even if the information amount is not much such as the partial fingerprint of the finger obtained by the still reading operation, it is possible to carry out the collation at a high precision.

Figure 3:
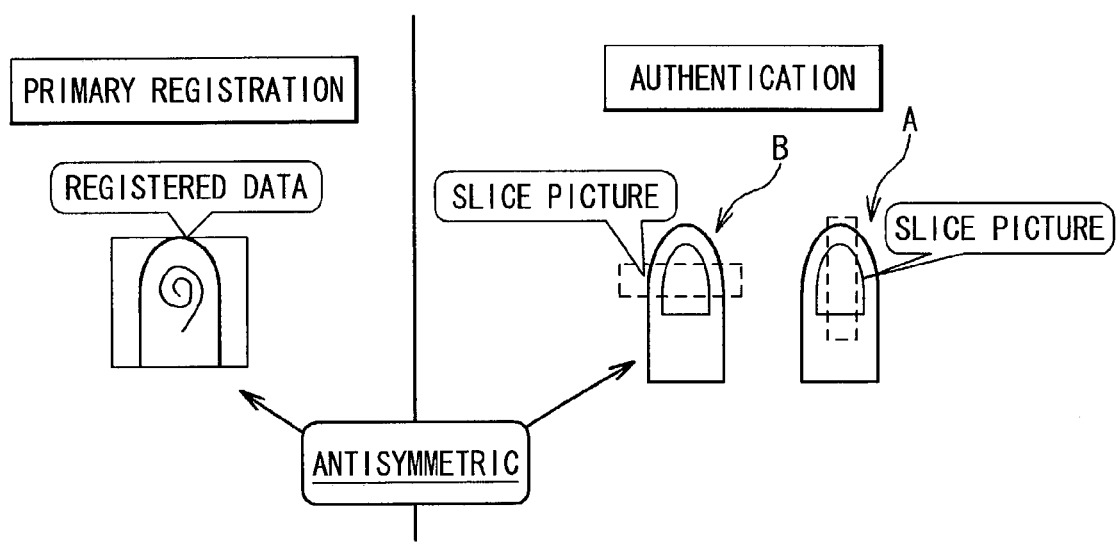
FIG. 3 is a view showing the scan condition of the fingerprint authenticating system according to the embodiment of the present invention.

So, in the fingerprint authenticating system according to the embodiment of the present invention, as shown in FIG. 3, at the time of the registration of the fingerprint, the sweep reading operation is carried out to generate and register the entire fingerprint picture of the finger. At the time of the collation of the fingerprint, the still reading operation is carried out to obtain the fingerprint picture having the shape of rectangular strips (hereafter, referred to as [slice picture (image)]) as shown in FIG. 10. Then, this slice picture and the registered fingerprint picture are collated to thereby solve the conventional problems.

Figure 1:
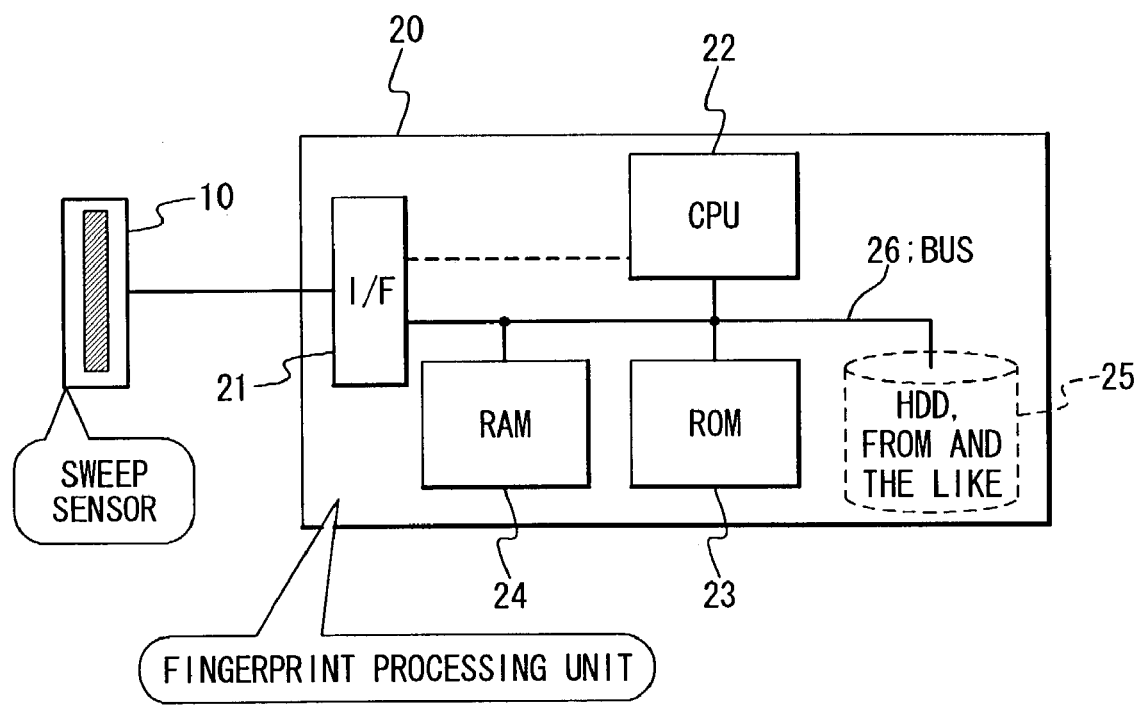
FIG. 1 is a view showing the configuration of the fingerprint authenticating system according to the embodiment of the present invention.

FIG. 1 is a view showing the configuration of the fingerprint authenticating system according to the embodiment of the present invention. This fingerprint authenticating system is provided with a fingerprint sensor 10 and a fingerprint processing unit 20.

The fingerprint sensor 10 is composed of a sweep type of a fingerprint sensor. As this fingerprint sensor 10, it is possible to use a device that reacts to a light, a heat, a capacitance, a pressure and the like. The outer shape of this fingerprint sensor 10 has a size of, for example, about 10×5 mm. This is the size that can be installed in a small apparatus, for example, such as a portable telephone and the like.

This fingerprint sensor 10 is designed such that a reading (scanning) speed can be changed on the basis of an instruction from the fingerprint processing unit 20. This fingerprint sensor 10 reads (scans) the fingerprint of a portion on which a finger is pushed, and then transmits as the slice picture having the shape of the rectangular strips shown in FIG. 10, to the fingerprint processing unit 20.

The fingerprint processing unit 20 is composed of: an interface (IF) 21, a central processing unit (hereafter, referred to as [CPU]) 22, a read only memory (hereafter, referred to as [ROM]) 23, a random access memory (hereafter, referred to as [RAM]) 24, a memory 25 and a bus 26 through which they are connected. The bus 26 is used to transmit and receive an address, a data, a control signal and the like between the interface 21, the CPU 22, the ROM 23, the RAM 24 and the memory 25.

The interface 21 controls the transmission and the reception of the signal between this fingerprint processing unit 20 and the fingerprint sensor 10. That is, this interface 21 transmits the control signal transmitted through the bus 26 to the fingerprint sensor 10, and transmits a fingerprint picture transmitted by the fingerprint sensor 10 to the bus 26. Incidentally, in FIG. 1, the interface 21 is configured so as to be connected to the bus 26. However, as shown by a dashed line in FIG. 1, it can be configured so as to be connected to the CPU 22.

The CPU 22 executes the process for re-configuring the fingerprint picture transmitted by the fingerprint sensor 10, the process for collating the fingerprint, and the like. The detailed operation of this CPU 22 will be described later with reference to a flowchart.

The ROM 23 stores a program through which the CPU 22 is operated. The CPU 22 sequentially reads out the program from this ROM 23, and executes the process for re-configuring the fingerprint picture, the process for collating the fingerprint, and the like.

The RAM 24 is used as a work region when the CPU 22 carries out the process in accordance with the program. A counter, a register, a flag, a table and the like are defined in this RAM 24.

The memory 25 is composed of, for example, a hard disc (HDD) and a flash ROM (FROM). This memory 25 stores user information. A part or whole of this memory 25 can be placed outside the fingerprint processing unit 20. In this case, as necessary, the user information is read from the memory 25 and transiently stored in the RAM 24. Then, the user information stored in this RAM 24 is used to carry out the process.

In case that this fingerprint authenticating system is applied to an apparatus essentially requiring the miniaturization, for example, such as a portable telephone, PHS and PDA, FROM as the memory 25 is applied to the apparatus. In case that it is applied to an apparatus that does not require the miniaturization so far, such as a personal computer and the like, HDD can be configured so as to be used.

Figure 2:
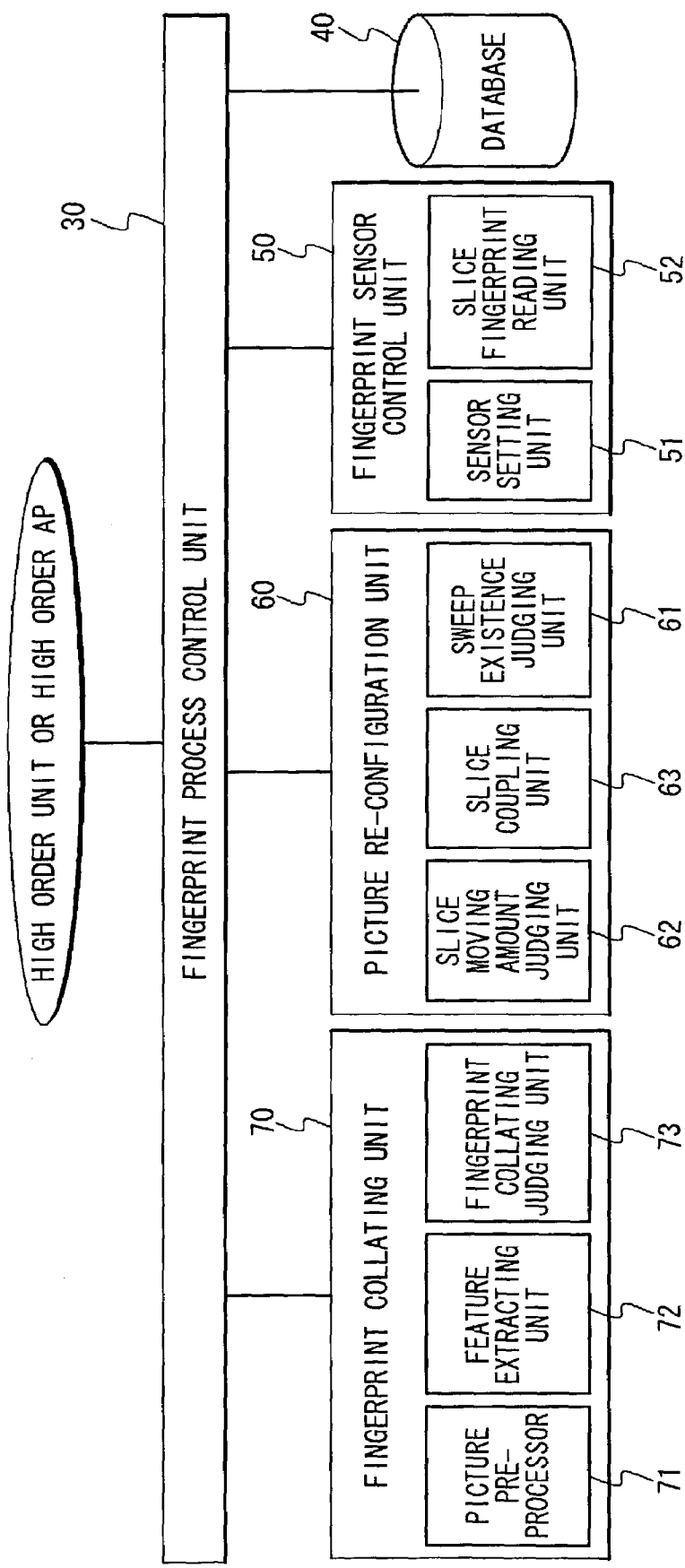
FIG. 2 is a view showing the block diagram of the fingerprint authenticating system according to the embodiment of the present invention.

The configuration of the software installed in this fingerprint authenticating system will be described below with reference to FIG. 2.

This software is composed of a fingerprint process control unit 30, a database 40, a fingerprint sensor control unit 50, a picture re-configuration unit 60 and a fingerprint collating unit 70.

The fingerprint process control unit 30 interprets a command transmitted from a high order unit or a high order application (AP), and controls the database 40, the fingerprint sensor control unit 50, the picture re-configuration unit 60 and the fingerprint collating unit 70, and then instructs them to execute an authenticating process. Also, it transmits the result of the authenticating process executed by the database 40, the fingerprint sensor control unit 50, the picture re-configuration unit 60 and the fingerprint collating unit 70, to the high order unit or the high order application. The high order unit designates the apparatus to which this fingerprint authenticating system is applied, and the high order application designates the program using the result of the authenticating process.

The database 40 stores a user information, a personal information and the like. This database 40 is prepared in the memory 25. The database 40 stores the user information, such as each person, ID, a fingerprint information and a personal information related to each person. The operations for reading, writing and deleting the user information from, to and from this database 40 are carried out in accordance with the instruction from the fingerprint process control unit 30.

The fingerprint sensor control unit 50 is composed of a sensor setting unit 51 and a slice fingerprint reading unit 52. The sensor setting unit 51 responds to the instruction from the fingerprint process control unit 30, and carries out an operational setting of the fingerprint sensor 10. This operational setting contains the setting of the reading (scanning) speed. The slice fingerprint reading unit 52 controls the fingerprint sensor 10, reads (scans) the slice picture, and then stores in the RAM 24.

The picture re-configuration unit 60 is composed of a sweep existence judging unit 61, a slice moving amount judging unit 62 and a slice coupling unit 63.

The sweep existence judging unit 61 calculates the difference between a plurality of slice pictures stored in the RAM 24, and thereby judges whether or not a sweep is carried out. The slice moving amount judging unit 62 collates two slice pictures with each other, and thereby calculates their moving amounts. The slice coupling unit 63 couples the slice pictures in accordance with the moving amounts calculated by the slice moving amount judging unit 62, and thereby reconfigures into the entire fingerprint, and then stores in the RAM 24.

The fingerprint collating unit 70 is composed of a picture pre-processor 71, a feature extracting unit 72, and a fingerprint collating judging unit 73.

The picture pre-processor 71 carries out the removal of noise in the fingerprint picture coupled by the slice coupling unit 63 and the like, and works into the fingerprint picture in which the feature is easily extracted. The feature extracting unit 72 extracts a feature information from the fingerprint picture worked by the picture pre-processor 71. The fingerprint collating judging unit 73 collates the feature information extracted by the feature extracting unit 72 with the feature information stored in the database 40, and thereby judges whether they are equal or different.

The operation of the fingerprint authenticating system configured as mentioned above will be described below.

At first, when this fingerprint authenticating system registers a fingerprint to be carried out at only the first trial (primary registration), a plurality of slice pictures read by the sweep reading operation are coupled to thereby re-configure the picture of the entire fingerprint of the finger and then store in the database 40. In this case, the feature of a fingerprint picture is extracted to thereby register the feature information indicative of the feature of the fingerprint. Incidentally, the database 40 can register the fingerprint picture itself of the re-configured entire finger. Or, it can be configured so as to convert the fingerprint picture into a numeral, a character and the like and then register.

Figure 4A:
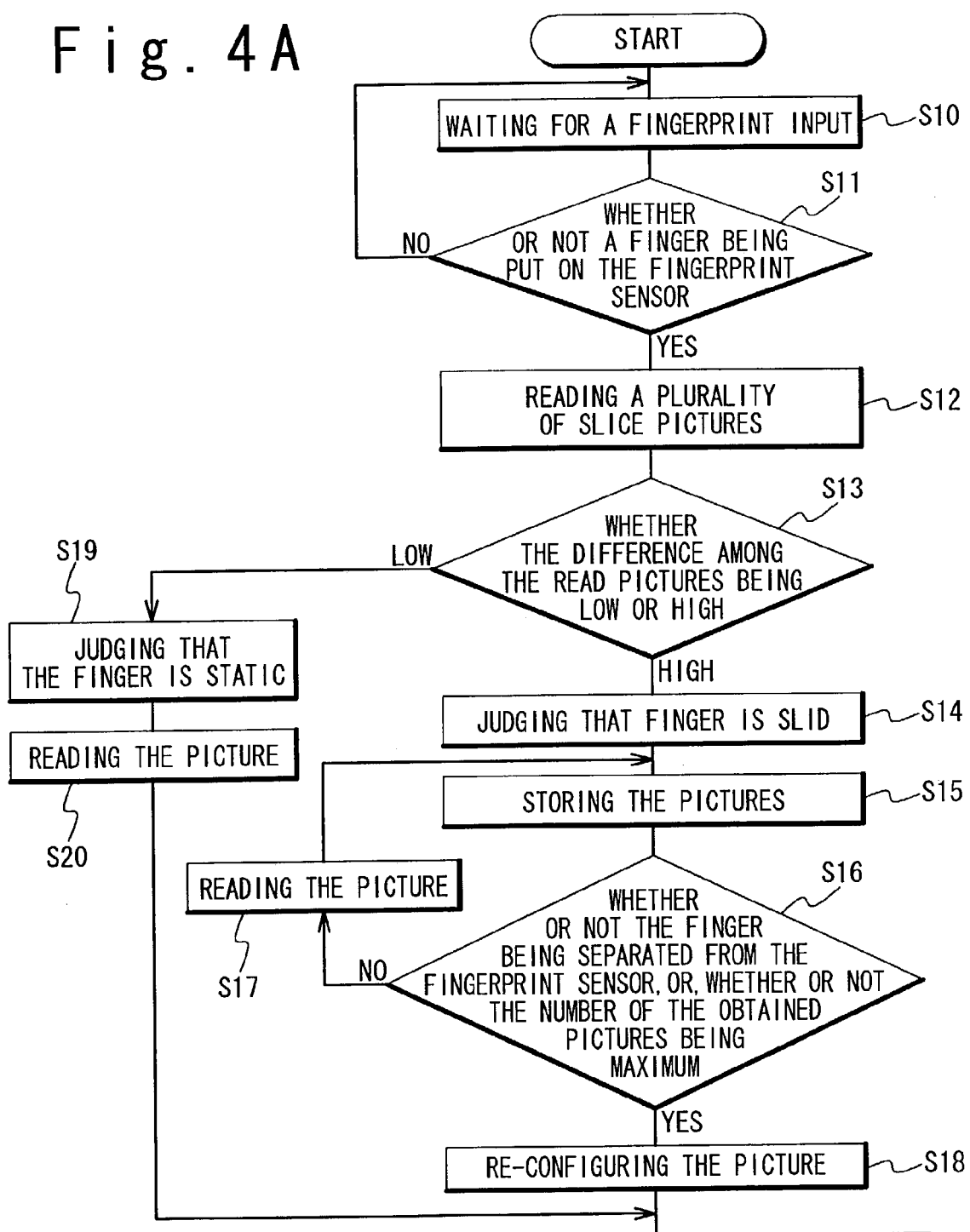
FIG. 4A is a first half of a flowchart showing the authenticating operation in this fingerprint authenticating system according to the embodiment of the present invention.
Figure 4B:
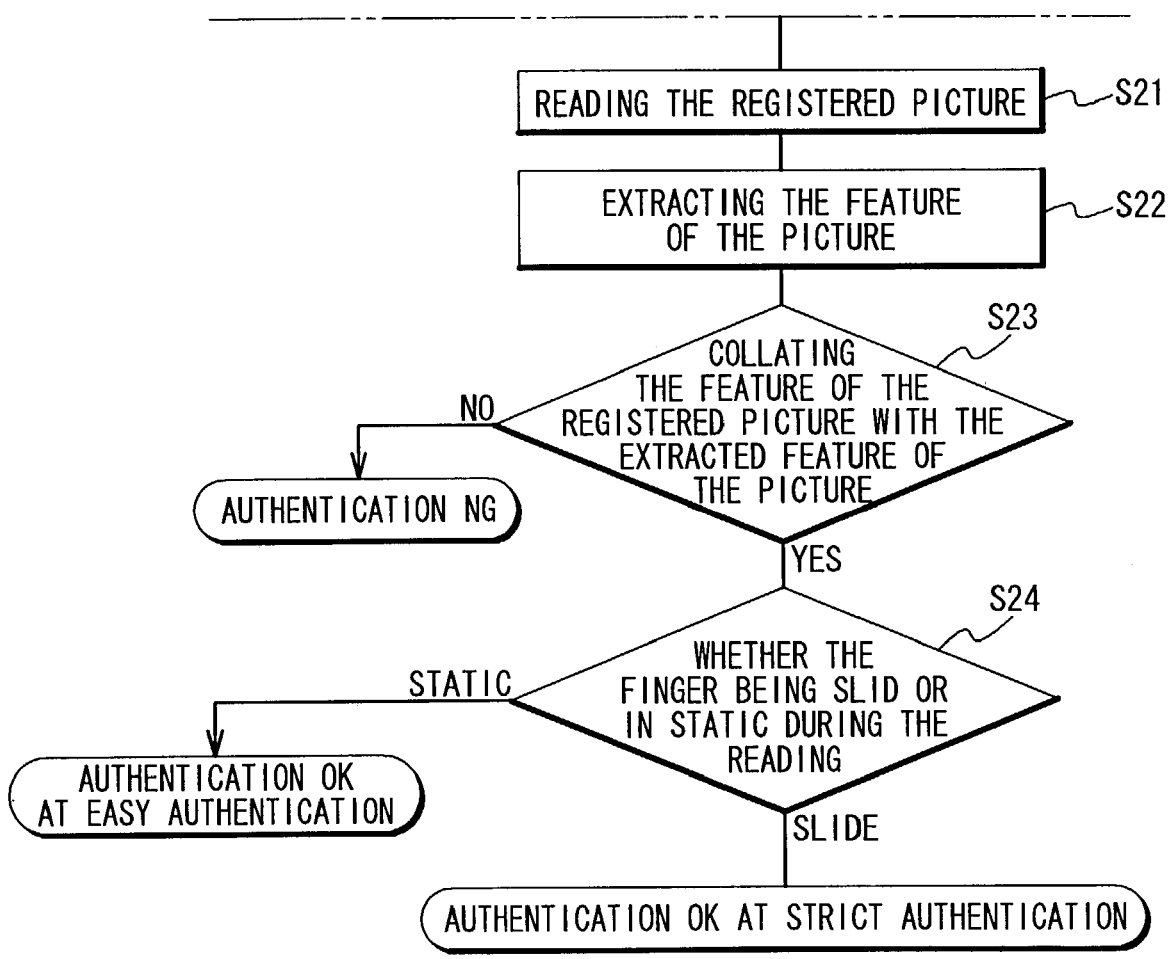
FIG. 4B is a second half of a flowchart showing the authenticating operation in this fingerprint authenticating system according to the embodiment of the present invention.

The operation for re-configuring the fingerprint of the entire finger in the registration of this fingerprint is equal to the processes at steps S15 to S18 in a process for authenticating a fingerprint, which will be described later with reference to FIGS. 4A and 4B. Here, that explanation is omitted.

The authenticating operation in this fingerprint authenticating system will be described below with reference to a flowchart shown in FIGS. 4A and 4B. Incidentally, the fingerprint of the entire finger is assumed to be that already registered in the database 40.

When the fingerprint authenticating system is actuated and a command for an authentication start is received from the high order unit or the high order application, the fingerprint process control unit 30 firstly actuates the slice fingerprint reading unit 52 of the fingerprint sensor control unit 50. This slice fingerprint reading unit 52 becomes firstly at a state waiting for a fingerprint input (Step S10). Next, whether or not a finger is put on the fingerprint sensor 10 is judged (Step S11). Here, if it is judged that the finger is put on the fingerprint sensor 10, the operation returns back to the step S10. While the steps S10 and S11 are repeated, this continues the state waiting for the fingerprint input.

At this state waiting for the fingerprint input, if it is judged at the step S11 that the finger is put on the fingerprint sensor 10, a plurality of slice pictures are read (Step S12). In this case, a direction on which the finger is put may be any of a longitudinal direction (Symbol A of FIG. 3) of the fingerprint sensor 10 and a direction (Symbol B of FIG. 3) orthogonal to this longitudinal direction. However, if the fingerprint of a static finger is read and collated, as shown by the symbol A of FIG. 3, the manner in which the finger is put on the longitudinal direction of the fingerprint sensor 10 is desirable from the viewpoint that the area of the fingerprint read by the fingerprint sensor 10 becomes wider. After that, the slice fingerprint reading unit 52 returns the control back to the fingerprint process control unit 30. Next, the fingerprint process control unit 30 actuates the sweep existence judging unit 61 of the picture re-configuration unit 60.

The sweep existence judging unit 61 firstly examines the degree of the change in the read picture (Step S13). This is carried out by calculating the difference between the plurality of slice pictures read from the fingerprint sensor 10 and then examining whether or not this calculated difference is equal to or more than a predetermined value. Here, if it is equal to or more than the predetermined value, namely, if the degree of the change is high, the finger is judged to be slid (Step S14). The sweep existence judging unit 61 returns the control back to the fingerprint process control unit 30. Then, the fingerprint process control unit 30 again actuates the slice fingerprint reading unit 52 of the fingerprint sensor control unit 50.

This slice fingerprint reading unit 52 stores the previously read slice picture in the RAM 24 (Step S15). Next, whether or not the finger is separated from the fingerprint sensor 10, or whether or not the number of the obtained pictures is maximum is examined (Step S16). If it is judged as [NO] at this step S16, the slice picture is then read (Step S17). After that, the sequence returns back to the step S15. After that, until it is judged as [YES] at the step S16, the processes at the steps S15 to S17 are repeatedly executed.

In the course of the repeated execution, if it is judged as [YES] at the step S16, the slice fingerprint reading unit 52 returns the control back to the fingerprint process control unit 30. Then, the fingerprint process control unit 30 actuates the slice moving amount judging unit 62 and the slice coupling unit 63 of the picture re-configuration unit 60. Thus, the process for re-configuring the picture is executed (Step S18).

At this process for re-configuring the picture, the slice moving amount judging unit 62 collates the two slice pictures and calculates their moving amounts. The slice coupling unit 63 couples the slice pictures to each other in accordance with the moving amounts calculated by the slice moving amount judging unit 62, and thereby re-configures into the entire fingerprint, and then stores in the RAM 24. After that, the slice coupling unit 63 returns the control back to the fingerprint process control unit 30.

At the step S13, if the calculated difference is not equal to nor more than the predetermined value, namely, if the degree of the change is low, the finger is judged to be static (Step S19). One of the plurality of slice pictures read at the step S12 is stored in the RAM 24 (Step S20). After that, the sweep existence judging unit 61 returns the control back to the fingerprint process control unit 30.

Next, the fingerprint process control unit 30 actuates the picture pre-processor 71 of fingerprint collating unit 70. The picture pre-processor 71 carries out a pre-process for carrying out the removal of the noise in the fingerprint picture which was previously read and stored in the RAM 24, and the like, and then working into the fingerprint picture in which the feature is easily extracted. Then, it reads the fingerprint picture of the entire finger registered in the database 40 (Step S21). After that, the picture pre-processor 71 returns the control back to the fingerprint process control unit 30.

The fingerprint process control unit 30 next actuates the feature extracting unit 72. Thus, the feature extracting unit 72 executes the feature extracting process (Step S22). After that, the feature extracting unit 72 returns the control back to the fingerprint process control unit 30.

The fingerprint process control unit 30 next actuates the fingerprint collating judging unit 73. This fingerprint collating judging unit 73 collates the feature information of the fingerprint picture of the entire finger read from the database 40 with the feature information extracted at the step S22 (Step S23). In this collating process, the strict collation is carried out in the case of the picture re-configured by reading the slid finger through the sweep reading operation, and the collation in which the degree of the strictness is dropped, is carried out in the case of the picture in which the static finger is read through the sweep reading operation. The collation is carried out, for example, by examining whether or not the similarity is a certain value or more.

If the fingerprint picture itself is registered in the database 40, the feature extracting process at the step S22 is skipped. Then, there may be a case that the collating process at the step S23 collates the fingerprint pictures with each other or collates the features after the feature extraction with each other. Also, if the data in which the fingerprint picture is converted into the numeral and the character is registered in the database 40, at the step S22, a process is carried out for converting the fingerprint picture read for the collation into the numeral, the character and the like. The collating process at the step S23 collates the numerals with each other and the characters with each other.

As the collated result at this step S23, if it is judged that they are not coincident, the fingerprint collating judging unit 73 transmits a data indicative of [Authentication NG], namely, indicative of the failure in the pass of the authentication, to the fingerprint process control unit 30. The fingerprint process control unit 30 receiving this data indicative of [Authentication NG] transmits the data indicative of its fact to the high order unit or the high order application, and ends the fingerprint authenticating process.

On the other hand, if they are judged to be coincident at the step S23, whether the fingerprint picture used for the fingerprint collation is the picture re-configured by reading the slid finger through the sweep reading operation or the picture in which the static finger is read through the still reading operation is then examined (Step S24).

At this step S24, the fingerprint collating judging unit 73, if judging that it is the picture in which the static finger is read through the still reading operation, recognizes [Authentication OK at Easy Authentication], namely, the pass in the authentication under the collation in the dropped strictness, and transmits the data indicative of its fact to the fingerprint process control unit 30. On the other hand, the fingerprint collating judging unit 73, if judging that it is the picture in which the slid finger is read through the sweep reading operation, recognizes [Authentication OK at Strict Authentication], namely, the pass in the authentication under the strict collation, and transmits the data indicative of its fact to the fingerprint process control unit 30. The fingerprint process control unit 30 receiving the data indicative of [Authentication OK at Easy Authentication] and [Authentication OK at Strict Authentication] transmits the data indicative of its fact to the high order unit or the high order application, and ends the fingerprint authenticating process.

As mentioned above, according to the fingerprint authenticating system based on this embodiment, the sweep type of the fingerprint sensor 10 is used as the fingerprint sensor 10. Thus, it is possible to configure the fingerprint sensor 10 at the cheap cost and reduce its outer shape. Consequently, it can be installed even in the small apparatus and the cheap apparatus. The leakage of the personal information can be protected even in those apparatuses.

Also, it is enough that the operation for contacting the finger with the fingerprint sensor 10 and sliding it is carried out one time at the time of the registration in the typical usage condition. Thus, the new work of sliding the finger for each authentication request is not forced on the user. Hence, it is possible to carry out the conventional fingerprint authentication for contacting the finger with the fingerprint sensor 10. Consequently, this solves the problem that the contaminant such as the sebum and the dirt of the finger is deposited around the fingerprint sensor 10. Also, since the sweep reading operation can be carried out at the time of the authentication, this can cope with the case in which the strict authentication is required.

Moreover, in this fingerprint reading system, it is only the one trial at the time of the registration that needs the re-configuration of the picture read by the fingerprint sensor. The re-configuration is not needed when the typical fingerprint authentication is performed. Thus, the authentication can be carried out in a short time. As a result, the processing unit having the high performance need not be installed in the apparatus. Hence, the apparatus including the fingerprint reading system can be designed at the cheap cost.

The above-mentioned embodiment has been explained under the assumption that the reading speed of the fingerprint is constant However, it can be designed such that the reading speed is different between the sweep reading operation and the still reading operation. In this case, if it is judged to be slid at the step S14, the fingerprint process control unit 30 actuates the sensor setting unit 51 and sets the reading speed of the fingerprint sensor 10 to a high speed. On the other hand, if it is judged to be static at the step S19, the fingerprint process control unit 30 actuates the sensor setting unit 51 and sets the reading speed of the fingerprint sensor 10 to a low speed. This configuration enables the sweep reading operation to be set to the high speed, which results in the improvement of the operability. Moreover, the electric power consumption can be reduced by carrying out the still reading operation at the low speed.

The example in which the fingerprint authenticating system having the above-mentioned configuration is applied to an apparatus will be described below. Hereafter, the operation for reading the fingerprint of a static finger is referred to as [Still Input], and the operation for reading the fingerprint of a moving finger is referred to as [Sweep Input].

Figure 5:
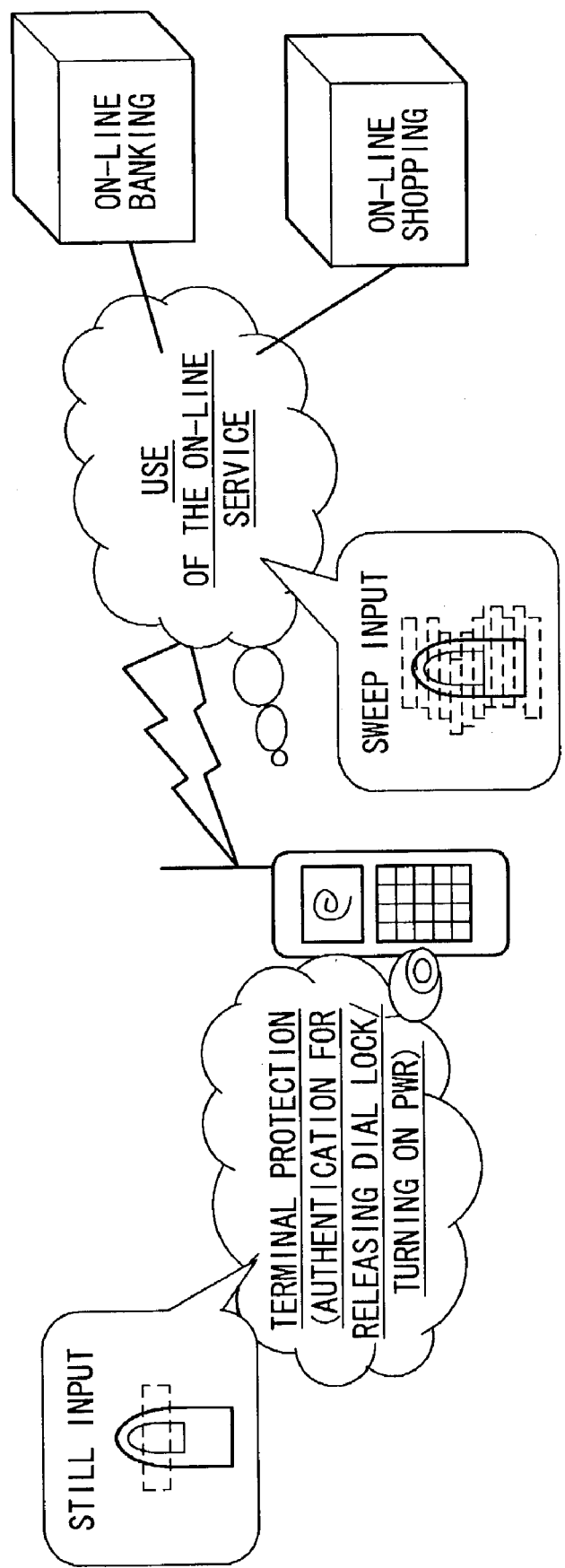
FIG. 5 is a view showing the fingerprint authenticating system according to the embodiment of the present invention applying to a portable telephone.

The fingerprint authenticating system according to the present invention can be used for a portable telephone, as shown in FIG. 5. The still input is used for the authentication of the action in which although the strict authentication is not required, a light authentication operation is required, for example, [Action for Releasing Dial Lock], [Action for Turning On Power Supply] and the like. In this case, the period between the time when the user desires to use the portable telephone and the time when it can be used can be made shorter than that of the conventional technique. Thus, this has a merit that stress does not occur.

On the other hand, the sweep input is used for the authentication when [Money On-Line Action], such as a mobile on-line shopping or a mobile on-line banking which requires the strict authentication since money is treated, is carried out. This case has a merit of improving a safety.

Figure 6:
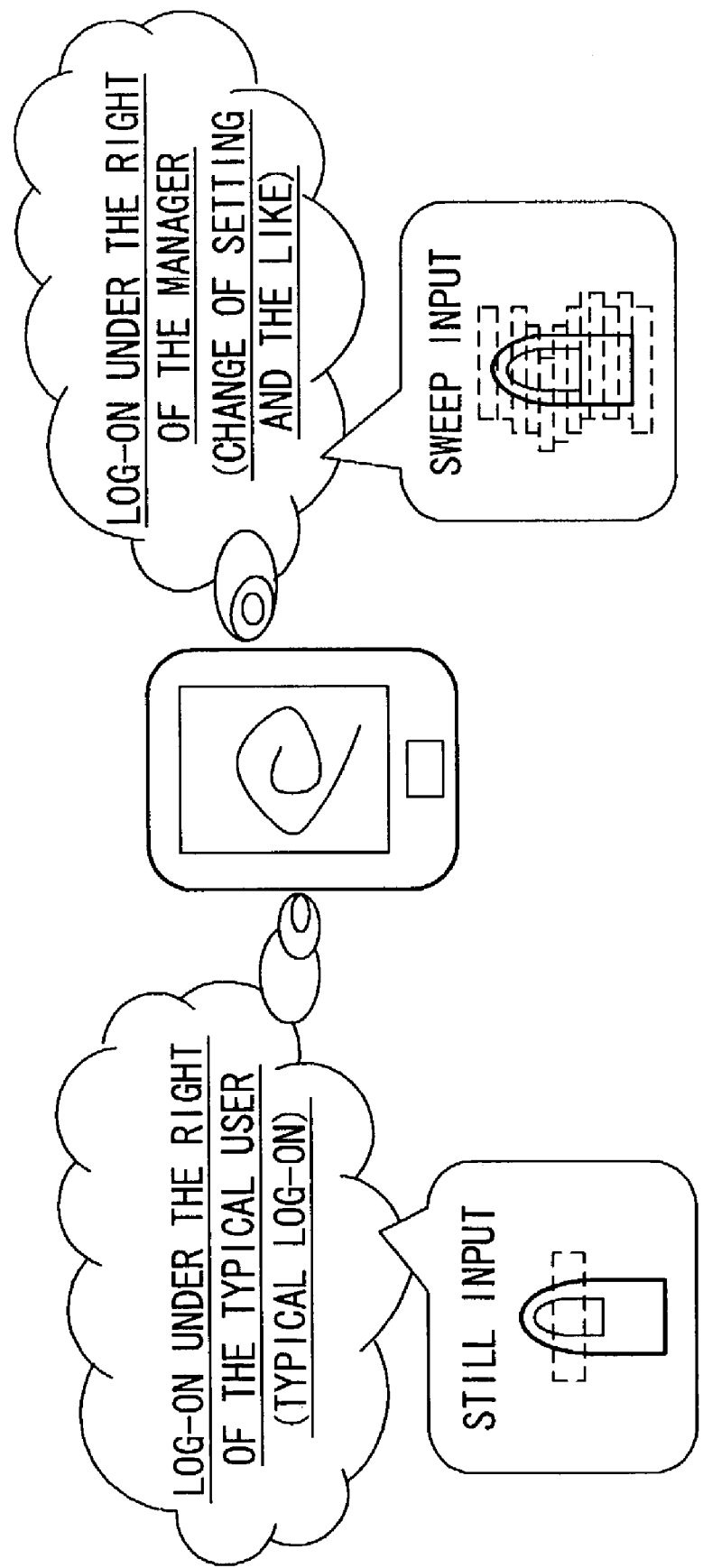
FIG. 6 is a view showing the fingerprint authenticating system according to the embodiment of the present invention applying to a PDA.

Also, the fingerprint authenticating system according to the present invention can be used for an apparatus including CPU whose performance is poor, for example, such as PDA, as shown in FIG. 6. The still input is used for the authentication at a time of log-on in [Typical User] since the log-on in the typical user is usually carried out in many cases. Thus, the fingerprint authenticating function can be lightly used in even the CPU having the poor performance. On the other hand, the sweep input is used for the authentication at the time of the log-on under a manager right. Hence, since the strict authentication is carried out, a security level can be kept high.

Figure 7:
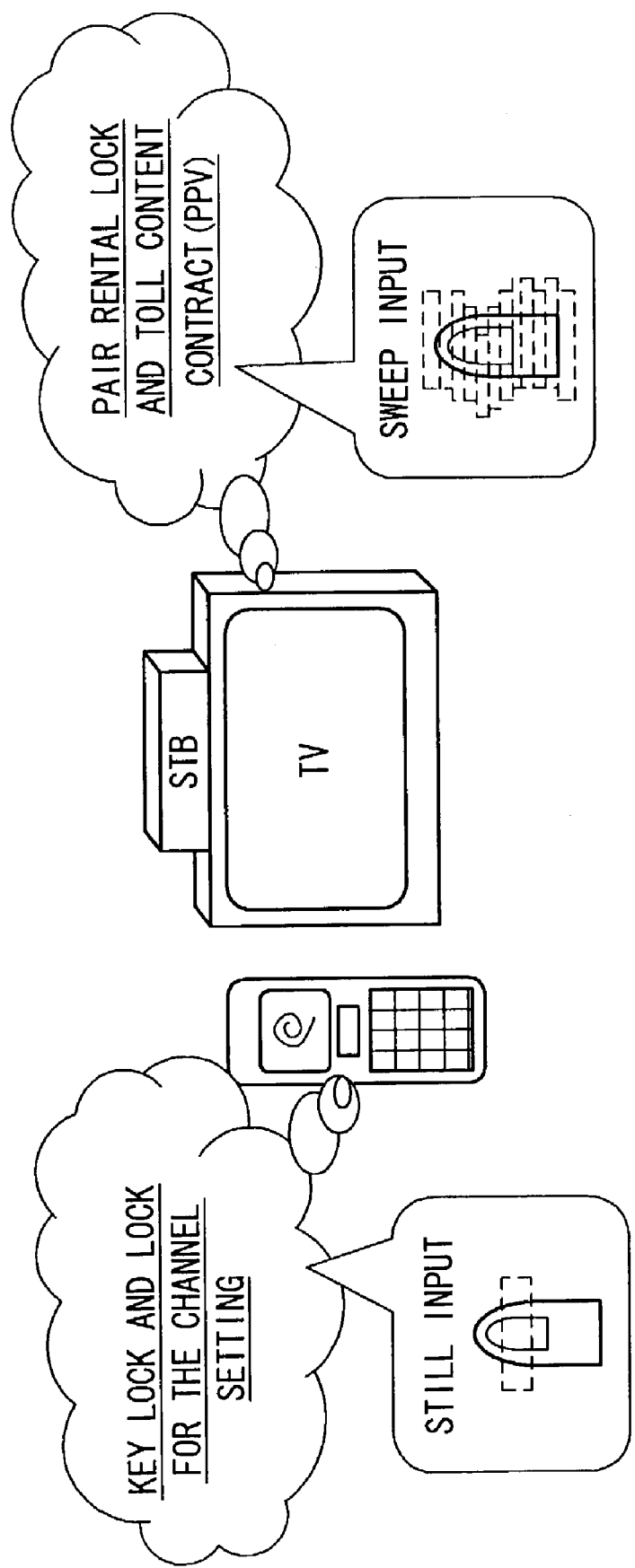
FIG. 7 is a view showing the fingerprint authenticating system according to the embodiment of the present invention applying to a set top box (media server)

Also, the fingerprint authenticating system according to the present invention can be used for a remote control unit of a set top box (media server) as shown in FIG. 7. The still input is used for the authentication when the typical action is carried out. Consequently, for example, it is possible to protect a mischief of a child and the like. On the other hand, the sweep input is used for the authentication when an action for releasing a pair rental lock, an action related to money such as a toll content contract or the like is carried out. Thus, since the strict authentication is carried out, it is possible to reserve the safety at a high level.

Figure 8:
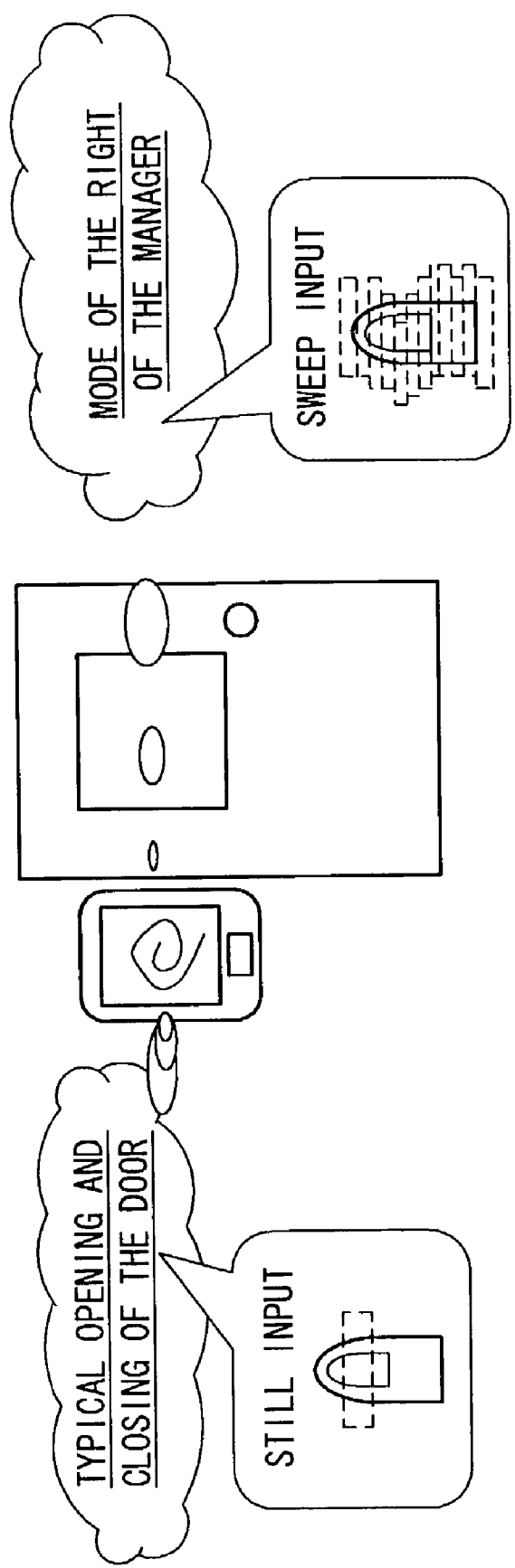
FIG. 8 is a view showing the fingerprint authenticating system according to the embodiment of the present invention applying to an entering/leaving control unit of a door.

The fingerprint authenticating system according to the present invention can be used for an entering/leaving control unit of a door, as shown in FIG. 8. The still input is used for the authentication when a typical door is opened and closed. The entering/leaving control unit is the apparatus used by many users. Thus, the fingerprint sensor and the periphery thereof are easily contaminated. However, the opportunity of the sweep is reduced to thereby suppress the contamination. On the other hand, the sweep input is used for the authentication, for example, when it proceeds to a manager right mode to change the setting of the apparatus. Consequently, since the strict authentication is carried out, it is possible to reserve the safety at the high level.

Moreover, the fingerprint authenticating system according to the present invention can be used for a personal computer, as shown in FIG. 9. The still input is used for the authentication when the personal computer under the typical user right is logged on. Consequently, the authentication of the high speed can be carried out to thereby reduce the waiting time of the user. Also, the user having the account for the manager right and the typical user right, if carrying out the still input, can log on under the typical user right without separately indicating the usage under the typical user right. Thus, the convenience is excellent.

On the other hand, the sweep input is used for the authentication when the personal computer under the manager right is logged on. In this case, when the manager logs on, the strict authentication associated with the sweep input is carried out. Thus, the security level can be kept high. Also, the user having the account for the manager right and the typical user right, if carrying out the sweep input, can log on under the manager right without separately indicating the usage under the manager right. Thus, the convenience is excellent.

Moreover, the apparatus using the fingerprint authenticating system according to the present invention can be designed such that a first application is executed in the still input, and a second application is executed in the sweep input. It can be designed such that a first command is inputted in the still input, and a second command is inputted in the sweep input. Or, it can be designed such that a first character string is inputted in the still input, and a second character string is inputted in the sweep input. Those designs enable a plurality of roles to be assigned to one key, if the fingerprint sensor 10 is considered as one key. As a result, even if it is applied to the small apparatus such as the portable telephone and PDA, the increase in the number of the keys can be suppressed to thereby contribute to the miniaturization of the apparatus.

As detailed above, according to the present invention, it can provide the fingerprint authenticating system, the fingerprint authenticating method and the fingerprint authenticating program, which can reduce the operation to be carried out by the user in order to read the fingerprint, and can reduce the contaminants deposited around the fingerprint sensor, and can be further applied to the small cheap apparatus.

What is claimed is:

1. A fingerprint authenticating system comprising:
    a fingerprint registering unit; and
    a fingerprint collating unit,
    wherein said fingerprint registering unit takes a first fingerprint data indicating a first portion, which is less than the entire fingerprint, of a first fingerprint from a first fingerprint sensor, registers said first fingerprint data to a memory unit, and takes a second fingerprint data indicating a second portion of a second fingerprint from a second fingerprint sensor,
    said fingerprint collating unit collates said second fingerprint data with said first fingerprint data to confirm whether or not said first fingerprint is equal to said second fingerprint, and
    an area of said first portion is equal to or larger than an area of said second portion.

2. The fingerprint authenticating system according to claim 1, wherein said first fingerprint sensor is relatively moved against said first fingerprint while taking said first fingerprint data, and
    said second fingerprint sensor is relatively stopped against said second fingerprint while taking said second fingerprint data.

3. The fingerprint authenticating system according to claim 1, wherein said first fingerprint sensor takes said first fingerprint data of n data which is obtained by scanning said first fingerprint n times, each of said n data is different from each other, n is a positive integer, and
    said second fingerprint sensor takes said second fingerprint data of m data which is obtained by scanning said second fingerprint m times, each of said m data is different from each other, m is a positive integer and less than n.

4. The fingerprint authenticating system according to claim 1, further comprising:
    a fingerprint sensor which is said first fingerprint sensor and said second fingerprint sensor.

5. The fingerprint authenticating system according to claim 4, wherein both said first fingerprint data and said second fingerprint data are any one of image data, numeral data and character data.

6. The fingerprint authenticating system according to claim 4, wherein said fingerprint sensor takes said first fingerprint data by scanning said first fingerprint toward a first direction, and takes said second fingerprint data by scanning said second fingerprint toward a second direction, and
    said first direction is different from said second direction.

7. The fingerprint authenticating system according to claim 4, wherein said fingerprint sensor is relatively moved against said second fingerprint while taking said second fingerprint data.

8. The fingerprint authenticating system according to claim 4, wherein said fingerprint sensor is provided with a sweep type of a fingerprint sensor.

9. A fingerprint authenticating system comprising:
    a fingerprint registering unit; and
    a fingerprint collating unit,
    wherein said fingerprint registering unit takes a first fingerprint data indicating a first portion of a first fingerprint from a first fingerprint sensor, registers said first fingerprint data to a memory unit, and takes a second fingerprint data indicating a second portion of a second fingerprint from a second fingerprint sensor,
    said fingerprint collating unit collates said second fingerprint data with said first fingerprint data to confirm whether or not said first fingerprint is equal to said second fingerprint, and
    an area of said first portion is equal to or larger than an area of said second portion,
    wherein said fingerprint registering unit reconfigures said first fingerprint data from a plurality of part data which indicate parts of said first fingerprint, and
    said fingerprint collating unit collates said second fingerprint data with said first fingerprint data by detecting an area corresponding to said second fingerprint data from said first fingerprint data.

10. A fingerprint authenticating system comprising:
    a fingerprint registering unit;
    a fingerprint collating unit, and
    a fingerprint sensor which is said first fingerprint sensor and said second fingerprint sensor,
    wherein said fingerprint registering unit takes a first fingerprint data indicating a first portion of a first fingerprint from a first fingerprint sensor, registers said first fingerprint data to a memory unit, and takes a second fingerprint data indicating a second portion of a second fingerprint from a second fingerprint sensor,
    said fingerprint collating unit collates said second fingerprint data with said first fingerprint data to confirm whether or not said first fingerprint is equal to said second fingerprint,
    an area of said first portion is equal to or larger than an area of said second portion,
    wherein said fingerprint sensor is relatively moved against said second fingerprint while taking said second fingerprint data, and
    wherein said fingerprint collating unit instructs an apparatus, to which the fingerprint authenticating system is applied, to carry out an operation different between one case of said second fingerprint data of said second fingerprint relatively moved against said fingerprint sensor and the other cases.

11. A fingerprint authenticating system comprising:
a fingerprint registering unit;
a fingerprint collating unit, and
a fingerprint sensor which is said first fingerprint sensor and said second fingerprint sensor,
wherein said fingerprint registering unit takes a first fingerprint data indicating a first portion of a first fingerprint from a first fingerprint sensor, registers said first fingerprint data to a memory unit, and takes a second fingerprint data indicating a second portion of a second fingerprint from a second fingerprint sensor,
said fingerprint collating unit collates said second fingerprint data with said first fingerprint data to confirm whether or not said first fingerprint is equal to said second fingerprint,
an area of said first portion is equal to or larger than an area of said second portion,
wherein said fingerprint sensor is relatively moved against said second fingerprint while taking said second fingerprint data, and
wherein said fingerprint collating unit takes said second fingerprint data as data that said second fingerprint relatively stopped against said second fingerprint sensor, in one case that all of a plurality of said second fingerprint data are similar to each other, and takes said second fingerprint data of said second fingerprint relatively moved against said fingerprint sensor, in the other cases.

12. A fingerprint authenticating system comprising:
a fingerprint registering unit;
a fingerprint collating unit, and
a fingerprint sensor which is said first fingerprint sensor and said second fingerprint sensor
wherein said fingerprint registering unit takes a first fingerprint data indicating a first portion of a first fingerprint from a first fingerprint sensor, registers said first fingerprint data to a memory unit, and takes a second fingerprint data indicating a second portion of a second fingerprint from a second fingerprint sensor,
said fingerprint collating unit collates said second fingerprint data with said first fingerprint data to confirm whether or not said first fingerprint is equal to said second fingerprint,
an area of said first portion is equal to or larger than an area of said second portion,
wherein said fingerprint sensor is relatively moved against said second fingerprint while taking said second fingerprint data, and
wherein said fingerprint collating unit carries out said collation more severely in one case of said second fingerprint data of said second fingerprint relatively moved against said fingerprint sensor than in the other cases.

13. A fingerprint authenticating system comprising:
a fingerprint registering unit;
a fingerprint collating unit, and
a fingerprint sensor which is said first fingerprint sensor and said second fingerprint sensor,
wherein said fingerprint registering unit takes a first fingerprint data indicating a first portion of a first fingerprint from a first fingerprint sensor, registers said first fingerprint data to a memory unit, and takes a second fingerprint data indicating a second portion of a second fingerprint from a second fingerprint sensor,
said fingerprint collating unit collates said second fingerprint data with said first fingerprint data to confirm whether or not said first fingerprint is equal to said second fingerprint,
an area of said first portion is equal to or larger than an area of said second portion,
wherein said fingerprint sensor is relatively moved against said second fingerprint while taking said second fingerprint data, and
wherein said fingerprint collating unit changes a speed of taking said second fingerprint data, based on whether or not said second fingerprint data of said second fingerprint relatively moved against said fingerprint sensor.

14. A fingerprint authenticating method comprising the steps of:
(a) taking a first fingerprint data indicating a first portion, which is less than the entire fingerprint, of a first fingerprint from a first fingerprint sensor;
(b) registering said first fingerprint data to a memory unit;
(c) taking a second fingerprint data indicating a second portion of a second fingerprint from a second fingerprint sensor; and
(d) collating said second fingerprint data with said first fingerprint data to confirm whether or not said first fingerprint is equal to said second fingerprint;
wherein an area of said first portion is equal to or larger than an area of said second portion.

15. The fingerprint authenticating method according to claim 14, wherein said first fingerprint sensor is relatively moved against said first fingerprint during said step (a), and said second fingerprint sensor is relatively stopped against said second fingerprint during said step (c).

16. The fingerprint authenticating method according to claim 14, wherein said first fingerprint sensor takes said first fingerprint data of n data which is obtained by scanning said first fingerprint n times during said step (a), each of said n data is different from each other, n is a positive integer, and
said second fingerprint sensor takes said second fingerprint data of m data which is obtained by scanning said second fingerprint m times during said step (c), each of said m data is different from each other, m is a positive integer and less than n.

17. The fingerprint authenticating method according to claim 14, wherein said first fingerprint sensor is equal to said second fingerprint sensor.

18. The fingerprint authenticating method according to claim 17, wherein both said first fingerprint data and said second fingerprint data are any one of image data, numeral data and character data.

19. The fingerprint authenticating method according to claim 17, wherein said first fingerprint sensor takes said first fingerprint data by scanning said first fingerprint toward a first direction, and said second fingerprint sensor takes said second fingerprint data by scanning said second fingerprint toward a second direction, and
said first direction is different from said second direction.

20. The fingerprint authenticating method according to claim 17, wherein said step (c) takes said second fingerprint data while said second fingerprint sensor is relatively moved against said second fingerprint.

21. A fingerprint authenticating method comprising:
(a) taking a first fingerprint data indicating a first portion of a first fingerprint from a first fingerprint sensor;
(b) registering said first fingerprint data to a memory unit;
(c) taking a second fingerprint data indicating a second portion of a second fingerprint from a second fingerprint sensor; and (d) collating said second fingerprint data with said first fingerprint data to confirm whether or not said first fingerprint is equal to said second fingerprint;

wherein an area of said first portion is equal to or larger than an area of said second portion, wherein said step (a) comprises:

(a1) reconfiguring said first fingerprint data from a plurality of part data which indicate parts of said first fingerprint;

wherein said step (d) collates said second fingerprint data with said first fingerprint data by detecting an area corresponding to said second fingerprint data from said first fingerprint data.

22. A fingerprint authenticating method comprising:

(a) taking a first fingerprint data indicating a first portion of a first fingerprint from a first fingerprint sensor;

(b) registering said first fingerprint data to a memory unit;

(c) taking a second fingerprint data indicating a second portion of a second fingerprint from a second fingerprint sensor; and (d) collating said second fingerprint data with said first fingerprint data to confirm whether or not said first fingerprint is equal to said second fingerprint;

wherein an area of said first portion is equal to or larger than an area of said second portion, wherein said first fingerprint sensor is equal to said second fingerprint sensor, wherein said step (c) takes said second fingerprint data while said second fingerprint sensor is relatively moved against said second fingerprint, and wherein said step (d) comprises:

(d1) instructing an apparatus, to which the fingerprint authenticating method is applied, to carry out an operation different between one case of said second fingerprint data of said second fingerprint relatively moved against said fingerprint sensor and the other cases.

23. A fingerprint authenticating method comprising:

(a) taking a first fingerprint data indicating a first portion of a first fingerprint from a first fingerprint sensor;

(b) registering said first fingerprint data to a memory unit;

(c) taking a second fingerprint data indicating a second portion of a second fingerprint from a second fingerprint sensor; and (d) collating said second fingerprint data with said first fingerprint data to confirm whether or not said first fingerprint is equal to said second fingerprint;

wherein an area of said first portion is equal to or larger than an area of said second portion, wherein said first fingerprint sensor is equal to said second fingerprint sensor, wherein said step (c) takes said second fingerprint data while said second fingerprint sensor is relatively moved against said second fingerprint, and wherein said step (c) takes said second fingerprint data as data that said second fingerprint relatively stopped against said second fingerprint sensor, in one case that all of a plurality of said second fingerprint data are similar to each other, and takes said second fingerprint data of said second fingerprint relatively moved against said fingerprint sensor, in the other cases.

24. A fingerprint authenticating method comprising:

(a) taking a first fingerprint data indicating a first portion of a first fingerprint from a first fingerprint sensor;

(b) registering said first fingerprint data to a memory unit;

(c) taking a second fingerprint data indicating a second portion of a second fingerprint from a second fingerprint sensor; and (d) collating said second fingerprint data with said first fingerprint data to confirm whether or not said first fingerprint is equal to said second fingerprint;

wherein an area of said first portion is equal to or larger than an area of said second portion, wherein said first fingerprint sensor is equal to said second fingerprint sensor, wherein said step (c) takes said second fingerprint data while said second fingerprint sensor is relatively moved against said second fingerprint, and wherein said step (d) carries out said collation more severely in one case of said second fingerprint data of said second fingerprint relatively moved against said fingerprint sensor in said step (c) than in the other cases.

25. A fingerprint authenticating method comprising:

(a) taking a first fingerprint data indicating a first portion of a first fingerprint from a first fingerprint sensor;

(b) registering said first fingerprint data to a memory unit;

(c) taking a second fingerprint data indicating a second portion of a second fingerprint from a second fingerprint sensor; and (d) collating said second fingerprint data with said first fingerprint data to confirm whether or not said first fingerprint is equal to said second fingerprint;

wherein an area of said first portion is equal to or larger than an area of said second portion, wherein said first fingerprint sensor is equal to said second fingerprint sensor, wherein said step (c) takes said second fingerprint data while said second fingerprint sensor is relatively moved against said second fingerprint, and wherein said step (c) changes a speed of taking said second fingerprint data, based on whether or not said second fingerprint data of said second fingerprint relatively moved against said fingerprint sensor.

26. A computer program product embodied on a computer-readable medium and comprising code that, when executed, causes a computer to perform the following:

(e) taking a first fingerprint data indicating a first portion, which is less than the entire fingerprint, of a first fingerprint from a first fingerprint sensor;

(f) registering said first fingerprint data to a memory unit;

(g) taking a second fingerprint data indicating a second portion of a second fingerprint from a second fingerprint sensor; and (h) collating said second fingerprint data with said first fingerprint data to confirm whether or not said first fingerprint is equal to said second fingerprint;

wherein an area of said first portion is equal to or larger than an area of said second portion.

27. The computer program product according to claim 26, wherein said first fingerprint sensor is relatively moved against said first fingerprint during said step (e), and said second fingerprint sensor is relatively stopped against said second fingerprint during said step (g).

28. The computer program product according to claim 26, wherein said first fingerprint sensor takes said first fingerprint data of n data which is obtained by scanning said first fingerprint n times during said step (e), each of said n data is different from each other, n is a positive integer, and said second fingerprint sensor takes said second fingerprint data of m data which is obtained by scanning said second fingerprint m times during said step (g), each of said m data is different from each other, m is a positive integer and less than n.

29. The computer program product according to claim 26, wherein said first fingerprint sensor is equal to said second fingerprint sensor.

30. The computer program product according to claim 29, wherein said both first fingerprint data and said second fingerprint data are any one of image data, numeral data and character data.

31. The computer program product according to claim 29, wherein said first fingerprint sensor takes said first fingerprint data by scanning said first fingerprint toward a first direction, and said second fingerprint sensor takes said second fingerprint data by scanning said second fingerprint toward a second direction, and said first direction is different from said second direction.

32. A computer program product embodied on a computer-readable medium and comprising code that, when executed, causes a computer to perform the following:
 (e) taking a first fingerprint data indicating a first portion of a first fingerprint from a first fingerprint sensor;
 (f) registering said first fingerprint data to a memory unit;
 (g) taking a second fingerprint data indicating a second portion of a second fingerprint from a second fingerprint sensor; and
 (h) collating said second fingerprint data with said first fingerprint data to confirm whether or not said first fingerprint is equal to said second fingerprint;
 wherein an area of said first portion is equal to or larger than an area of said second portion,
 wherein said step (e) comprises the step of:
 (e1) reconfiguring said first fingerprint data from a plurality of part data which indicate parts of said first fingerprint;
 wherein said step (h) collates said second fingerprint data with said first fingerprint data by detecting an area corresponding to said second fingerprint data from said first fingerprint data.

33. The computer program product according to claim 29, wherein said step (g) takes said second fingerprint data while said second fingerprint sensor is relatively moved against said second fingerprint.

34. A computer program product embodied on a computer-readable medium and comprising code that, when executed, causes a computer to perform the following:
 (e) taking a first fingerprint data indicating a first portion of a first fingerprint from a first fingerprint sensor;
 (f) registering said first fingerprint data to a memory unit;
 (g) taking a second fingerprint data indicating a second portion of a second fingerprint from a second fingerprint sensor; and
 (h) collating said second fingerprint data with said first fingerprint data to confirm whether or not said first fingerprint is equal to said second fingerprint;
 wherein an area of said first portion is equal to or larger than an area of said second portion,
 wherein said first fingerprint sensor is equal to said second fingerprint sensor,
 wherein said step (g) takes said second fingerprint data while said second fingerprint sensor is relatively moved against said second fingerprint, and
 wherein said step (h) comprises the step of:
 (h1) instructing an apparatus, to which the fingerprint authenticating method is applied, to carry out an operation different between one case of said second fingerprint data of said second fingerprint relatively moved against said fingerprint sensor and the other cases.

35. A computer program product embodied on a computer-readable medium and comprising code that, when executed, causes a computer to perform the following:
 (e) taking a first fingerprint data indicating a first portion of a first fingerprint from a first fingerprint sensor;
 (f) registering said first fingerprint data to a memory unit;
 (g) taking a second fingerprint data indicating a second portion of a second fingerprint from a second fingerprint sensor; and
 (h) collating said second fingerprint data with said first fingerprint data to confirm whether or not said first fingerprint is equal to said second fingerprint;
 wherein an area of said first portion is equal to or larger than an area of said second portion,
 wherein said first fingerprint sensor is equal to said second fingerprint sensor,
 wherein said step (g) takes said second fingerprint data while said second fingerprint sensor is relatively moved against said second fingerprint, and
 wherein said step (g) takes said second fingerprint data as data that said second fingerprint relatively stopped against said second fingerprint sensor, in one case that all of a plurality of said second fingerprint data are similar to each other, and takes said second fingerprint data of said second fingerprint relatively moved against said fingerprint sensor, in the other cases.

36. A computer program product embodied on a computer-readable medium and comprising code that, when executed, causes a computer to perform the following:
 (e) taking a first fingerprint data indicating a first portion of a first fingerprint from a first fingerprint sensor;
 (f) registering said first fingerprint data to a memory unit;
 (g) taking a second fingerprint data indicating a second portion of a second fingerprint from a second fingerprint sensor; and
 (h) collating said second fingerprint data with said first fingerprint data to confirm whether or not said first fingerprint is equal to said second fingerprint;
 wherein an area of said first portion is equal to or larger than an area of said second portion,
 wherein said first fingerprint sensor is equal to said second fingerprint sensor,
 wherein said step (g) takes said second fingerprint data while said second fingerprint sensor is relatively moved against said second fingerprint, and
 wherein said step (h) carries out said collation more severely in one case of said second fingerprint data of said second fingerprint relatively moved against said fingerprint sensor in said step (g) than in the other cases.

37. A computer program product embodied on a computer-readable medium and comprising code that, when executed, causes a computer to perform the following:
 (e) taking a first fingerprint data indicating a first portion of a first fingerprint from a first fingerprint sensor;
 (f) registering said first fingerprint data to a memory unit;
 (g) taking a second fingerprint data indicating a second portion of a second fingerprint from a second fingerprint sensor; and
 (h) collating said second fingerprint data with said first fingerprint data to confirm whether or not said first fingerprint is equal to said second fingerprint;

wherein an area of said first portion is equal to or larger than an area of said second portion,
wherein said first fingerprint sensor is equal to said second fingerprint sensor,
wherein said step (g) takes said second fingerprint data while said second fingerprint sensor is relatively moved against said second fingerprint, and wherein said step (g) changes a speed of taking said second fingerprint data, based on whether or not said second fingerprint data of said second fingerprint relatively moved against said fingerprint sensor.

* * * * *